UNITED STATES PATENT OFFICE.

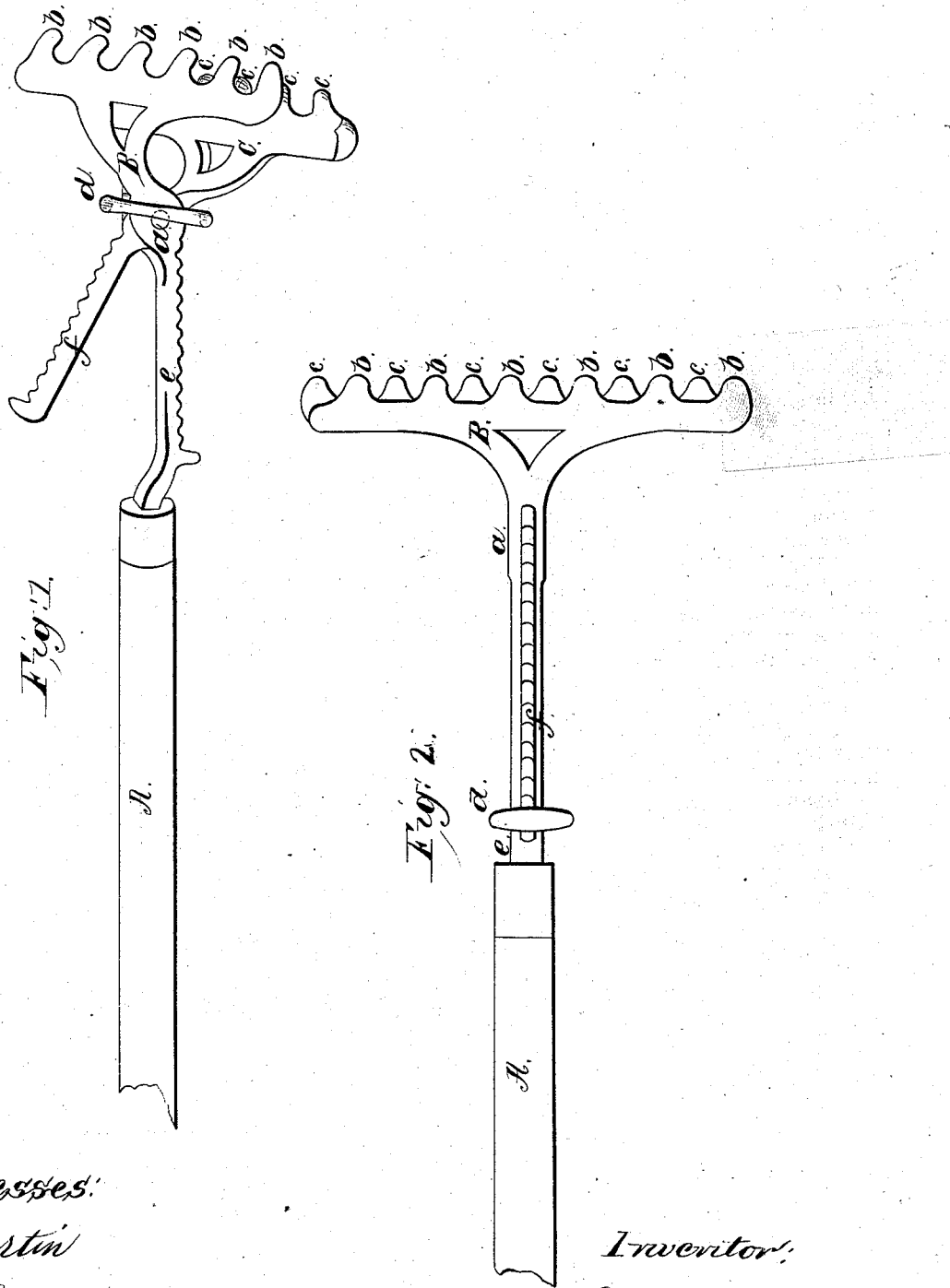

LOUIS C. RODIER, OF SPRINGFIELD, MASSACHUSETTS, ASSIGNOR TO HIMSELF AND HENRY HAMMOND.

IMPROVED MOP-HEAD.

Specification forming part of Letters Patent No. 55,961, dated June 26, 1866; antedated December 26, 1875.

*To all whom it may concern:*

Be it known that I, LOUIS C. RODIER, of Springfield, in the county of Hampden and Commonwealth of Massachusetts, have invented a new and useful Improvement in Mop-Heads; and I do hereby declare the following is a full, clear, and exact description of the same, reference being had to the accompanying drawings making a part of this specification, in which—

Figure 1 is a perspective view of the mop-head and a portion of the handle, showing the jaws open ready for receiving the cloths or rags. Fig. 2 is a top view of the same when the handle is lying down, showing the jaws closed.

A is a common wooden handle having a ferrule on its end, and receiving the shank $e$ on the jaw B. B and C are two jaws hinged together at $a$. $b\ b\ b\ b\ b\ b$ are teeth or fingers on the jaw B, and $c\ c\ c\ c\ c\ c$ are corresponding teeth or fingers on the jaw C. Now, these fingers or teeth are so situated that a tooth on one jaw is opposite a space on the other jaw, so that when the jaws are forced together by sliding the ring $d$ onto the notched shanks or arms $e\ f$ the teeth will mesh in together, and thereby hold any substance that is placed between them very firmly, and particularly tend to hold the cloth or other substance in place during the operation of wringing.

I do not confine myself to the particular arrangement of the fingers or teeth just described, wherein one finger or tooth comes opposite a space in the opposite jaw, as teeth arranged on a jaw extended each side of the center line of the handle, as shown in the drawings, will operate to confine the cloth in place, to a certain extent, whether the teeth have such relative positions to each other as just described or not.

Now, by inserting the cloths or sponge between the jaws, bringing the shanks together, and sliding the ring or link $d$ up over the notches until it holds firmly the whole operation of making a mop is performed, and there are no sharp corners projecting beyond the cloth to mar anything with which it may come in contact in use.

Now, having fully described the construction and operation of my invention, what I claim as new, and desire to secure by Letters Patent, is—

The jaws B and C, having fingers or teeth, for the purpose herein specified, when combined with the handle and ring $d$ in such manner as to form a floor-mop, the whole being arranged substantially as herein described.

LOUIS C. RODIER.

Witnesses:
I. A. MARTIN,
MILTON BRADLEY.